US005252837A

United States Patent [19]

Miyamoto

[11] Patent Number: 5,252,837

[45] Date of Patent: Oct. 12, 1993

[54] COLLISION PREVENTIVE DRIVE DEVICE FOR OPTICAL SYSTEM

[75] Inventor: Naruyuki Miyamoto, Osaka, Japan

[73] Assignee: Mita Industrial Co., Ltd., Osaka, Japan

[21] Appl. No.: 961,440

[22] Filed: Oct. 15, 1992

[30] Foreign Application Priority Data

Oct. 16, 1991 [JP] Japan ................................ 3-267332
Oct. 21, 1991 [JP] Japan ................................ 3-272393

[51] Int. Cl.[5] ........................................ G01N 21/86

[52] U.S. Cl. ................................ 250/561; 318/467

[58] Field of Search ............... 250/561; 318/466, 467, 318/468, 470, 603, 626; 358/497

[56] References Cited

U.S. PATENT DOCUMENTS 4,055,023 10/1977 Gatand et al. ..................... 318/467
4,556,832 12/1985 Rollins ............................ 318/467

*Primary Examiner*—David C. Nelms
*Assistant Examiner*—K. Shami
*Attorney, Agent, or Firm*—Koda and Androlia

[57] ABSTRACT

In a drive device for an optical system of which scanning is carried out by means of a motor controlled for drive and stop by availability and unavailability of the power supply, any collision of the optical system moving by its inertia with its surrounding devices is not permitted, and furthermore even in restarting after the power supply is stopped during action of image forming, any collision of the optical system with its surrounding devices is not permitted. When the optical system is located in an area outside from a timing switch and a return switch, the motor is controlled for reversal braking so as to quickly reverse the direction of moving, thereby causing the motor to be usually stopped when the optical system returns to the safety area.

6 Claims, 5 Drawing Sheets

COLLISION PREVENTIVE DRIVE DEVICE FOR OPTICAL SYSTEM

BACKGROUND OF THE INVENTION

1. Field of the invention

The present invention relates to a drive device for optical system equipped in an image forming equipment such as, for example, a document copying machine, etc.

2. Description of the Prior Art

Generally, in this kind of image forming equipment, an optical system is arranged below the lower side of a document table, and the optical system is reciprocatably supported by rails laid in parallelism with the document table within a specified area between an original position (home position) and a return position on the rails. The optical system is driven by, for example, a servo motor, and the servo motor is controlled for drive and stop with availability and unavailability of power supply to the servo motor.

A magnification lens is provided on an optical path from the optical system to a photosensitive body, and electrostatic latent image can be formed at a specified ratio of magnification on the surface of the photosensitive body by adjusting the movement of the lens along the optical path and at the same time carrying out scanning with the optical system.

Hereupon, in that case, although the optical system is driven to move as making the above original position as reference, existence of the optical system at the original position is detected by a so-called home position switch which is provided thereat.

And when the home position switch is in the OFF status in the event that the power source of the corresponding equipment is turned ON, the optical system is once driven and shifted to the paper feed side and subsequently is driven to move in the paper delivery side since it is not clear at which position the optical system exists, i.e., the paper feed side or the paper delivery side. This is called a so-called initial action. The above home position switch is turned ON with this action, and the processing for making the optical system move to the original position for correction is carried out. Therefore, when the home position switch is already turned ON in the case that the power source is turned ON, the above initial action is not performed.

Hereupon, in such image forming equipment, in the event that during image forming action, for example, paper jamming occurs or a cover attached to the box-like body is opened, power supply to internal devices of the corresponding equipment is immediately shut off, for the purpose of preventing the equipment from being damaged or taking danger to an operator into consideration.

Therefore, in the case that the optical system is positioned in the vicinity of the turning-back point within the above specified area during stoppage of the power supply, the optical system is likely to move by inertia since the power supply to the servo motor is stopped, and there is a possibility for the optical system to come into collision with the box-like body, lens, etc. Although it is better that the size of the box-like body is determined, taking the travelling distance of the optical system by inertia into consideration, it will never be a solution best-suited to the reality under such circumstances that compactness of machines and moreover high processing speed of image forming are recently in progress.

Furthermore, if the above initial action is carried out when the power supply is started again after for example, treatment for the above paper jamming is finished, there will be a possibility for the optical system to come into collision with the box-like body, the lens, etc.

SUMMARY OF THE INVENTION

So, the present invention has been developed in view of the above situation, and it is the first object of the invention to provide a drive device for optical system equipped with control function to positively avoid collision between the optical system and its surrounding devices even though the power supply is shut off during action of image forming.

Furthermore, it is the second object of the invention to provide a drive device for optical system equipped with control function to positively avoid collision between the optical system and its surrounding devices on the occasion of re-starting.

In order to achieve the first object, principal means adopted by the present invention is such that a drive device for optical system for reciprocating the optical system within a specified area on rails by means of a motor controlled for drive and stop with availability and unavailability of power supply, comprises; position sensing means for sensing a position of the optical system on the rails; stop command sensing means for sensing a signal of stop command of the power supply; and stop control means for controlling for reversal braking of the motor according to the position of the optical system sensed by the position sensing means when a signal of the stop command is sensed, for returning the optical system within the specified area and for stopping it.

In a drive device according to the present invention, a motor is controlled for reversal braking according to the position of the optical system detected by the position sensing means. And after the optical system is returned to and moved within the specified area where there is no possibility for the optical system to come into collision with its surrounding devices, the motor is controlled and stopped. Therefore, even in the case that the power supply is stopped during action of image forming, it is possible to positively avoid the collision between the optical system and the surrounding devices.

In order to achieve the second object, principal means adopted by the present invention is such that a drive device for optical system for reciprocating the optical system within a specified area making an original position on rails as reference by means of a motor controlled for drive and stop with availability and unavailability of power supply, comprises; stop command sensing means for sensing a signal of stop command of the power supply; stop position sensing means for sensing a stop position of the optical system on the rails when the optical system comes to a stop by a signal of stop command; and returning control means for changing over a direction of travelling according to the stop position of the optical system sensed by the stop position sensing means when the stop command is cancelled, and for returning the optical system to the original position and for stopping it.

In a drive device according to the present invention, in the case that there is a possibility for the optical system to come into collision with its surrounding devices if the stop position of the optical system sensed by the stop position sensing means is in the vicinity of the turning-back point of the specified area and for example, an initial action is performed when the power supply is started, the direction of travelling of the optical system is immediately changed over, and the optical system is controlled to be returned to the original position and to be stopped.

Therefore, even in the case that during action of image forming, the power supply is re-started after it is once stopped, it is possible to positively avoid the collision between the optical system and its surrounding devices.

DETAILED DESCRIPTION OF THE PREFERRED EMBODIMENTS

With reference to the drawings attached hereto, some preferred embodiments in which the invention is embodied are described for the purpose of understanding the invention. Well, the following preferred embodiments are merely examples of the present invention, and they are not of such property as limiting the technical scope of the invention.

Figure 1:
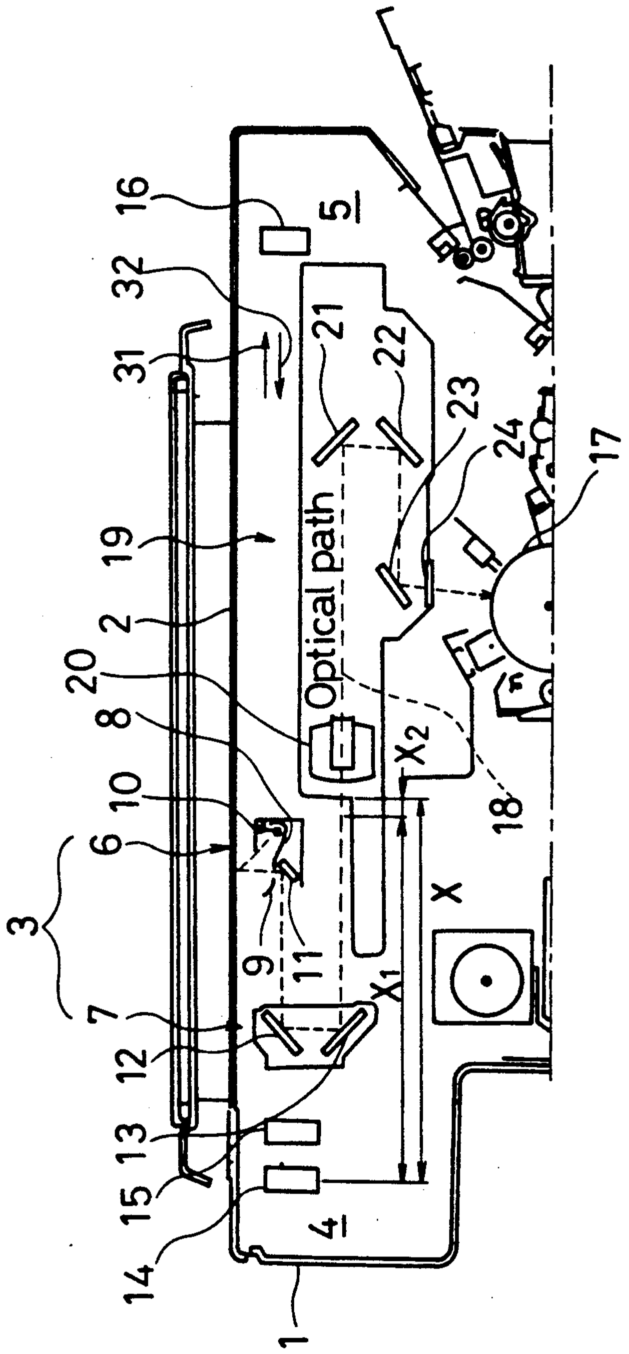
FIG. 1 is a construction view of essential parts of an image forming equipment provided with a drive device for optical system according to a preferred embodiment of the present invention.

As shown in FIG. 1, in an image forming equipment equipped with a drive device according to a preferred embodiment, an optical system unit 3 is provided below a document table 2 within the box-like body 1, and the optical system unit 3 is reciprocatably supported by rails not shown but arranged in parallelism with the document table 2 within a specified area between an original position 4 (home position) and a return position 5 on the rails.

The optical system unit 3 comprises a first traveling frame 6 and a second traveling frame 7, and the first traveling frame 6 and the second traveling frame 7 are mutually related with intervention of a wire so that they can travel at a speed ratio of 2:1.

The first traveling frame 6 comprises reflection plates 8, 9, a halogen lamp 10 and a mirror 11, etc., and the second traveling frame 7 is provided with mirrors 12, 13, etc.

Figure 2:
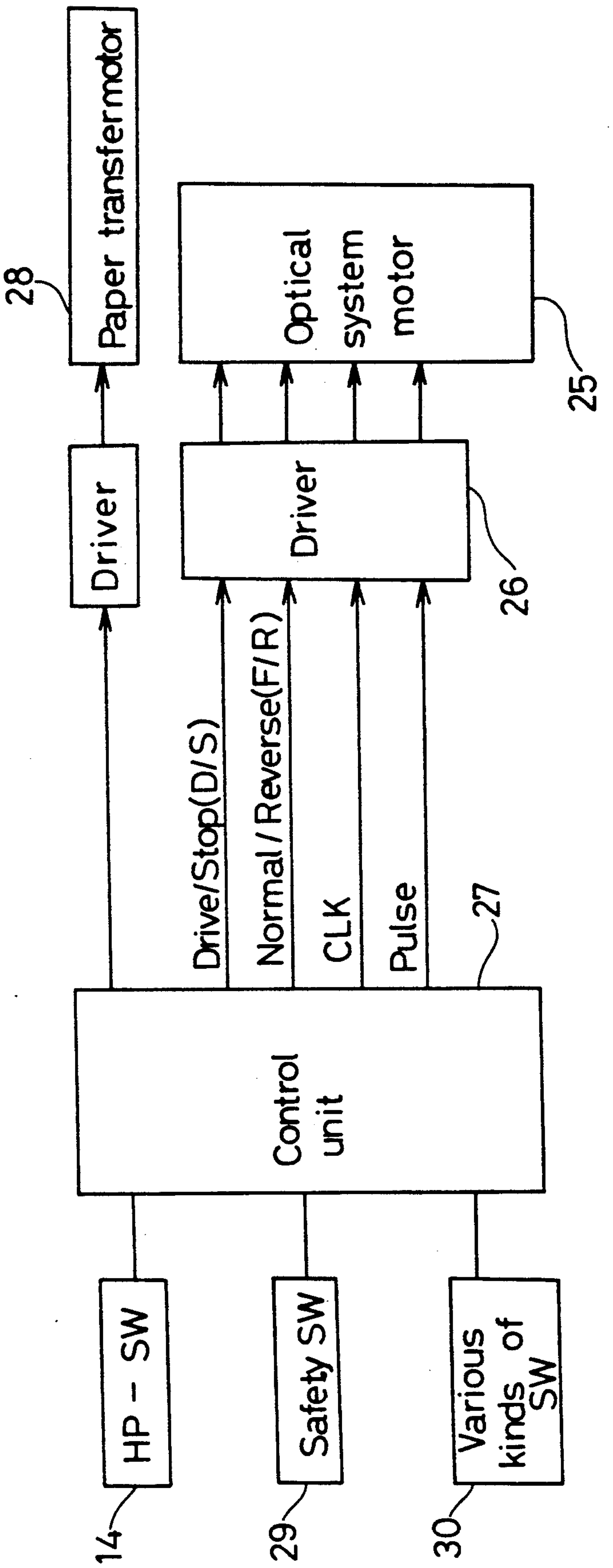
FIG. 2 is a block diagram showing the outline composition of the essential parts of the drive device.

And the position of the optical system unit 3 on the rails can be detected by turning ON and OFF a home position switch (HP-SW) 14, a timing switch (TIM-SW) 15, a return switch (RET-SW) 16, respectively, by means of an actuator (not shown) attached to the first traveling frame 6 and further by counting the number of pulses outputted from an encoder connected to a motor 25 (Refer to FIG. 2) which drives the optical system unit 3. In that case, the home position switch 14 is for detecting the first traveling frame 6 of the optical system unit 3 on the original position 4, the timing switch 15 is for acting to take timing in scanning a document image by the optical system unit 3. And the return switch 16 is for acting to detect the first traveling frame 6 of the optical system unit 3 in the return position 5.

A magnification lens 20 which constitutes a lens unit 19 is provided on an optical path 18 from the optical system unit 3 to a photosensitive body 17, and the lens 20 is promptly moved and adjusted along the optical path 18 according to the ratio of image forming magnification. Mirrors 21, 22, 23 and a filter 24, etc. are provided on the lens unit 19 as well as the lens 20.

The motor 25 (Refer to FIG. 2) which drives the optical system unit 3 is driven and stopped according to availability and unavailability of a power supply and is controlled by a control device 27 via a driver 26. A transfer motor 28 to transfer sheets of paper to the photosensitive body 17, a safety switch 29 for detecting the opening and closing state of a cover not shown, which is provided at the box-like body 1, and each kind of switches 30, etc. are connected to the control device 27.

In the image forming equipment according to the above construction, the lens 20 is firstly moved and adjusted in a prompt direction according to a specified ratio of magnification during action of image forming.

And as the motor 25 is turned ON, a rotation of the photosensitive body 17 is started, the optical system unit 3 begins scanning, and exposure is carried out by a halogen lamp 10.

Namely, the first traveling frame 6 of the optical system unit 3 which has began to move from the original position 4 detected by the home position switch 14 turns the timing switch 15 ON. Thereafter, the optical system unit 3 begins to scan according to the size of paper and ratio of magnification.

The direction of scanning is shown with an arrow mark 31 (Normal rotation direction).

As scanning has been carried out as shown above and the first traveling frame 6 reaches the return position 5, namely, the return switch 16 is turned ON, the motor 25 is reversely rotated and drive-controlled, thereby causing the moving direction of the optical system unit 3 to be reversed. The moving direction at that time is shown with an arrow mark 32.

As the optical system unit 3 which has been reversely moved as shown above moves toward the stop position and the timing switch 15 is turned ON, the motor 25 is turned OFF, and the optical system unit 3 comes to a stop at the original position 4 (under the status that the HP-SW is turned ON).

A document image which has been light-irradiated by the halogen lamp 10 is formed on the mirrors 11, 12, 13, the lens 20, the mirrors 21, 22, and 23 in the order, and it penetrates a filter 24 and is irradiated on the photosensitive body 17.

Thereby, electrostatic latent image is formed on the surface of the photosensitive body 17, and it can be turned into visible image by developing the electrostatic latent image.

The visible image on the photosensitive body 17 is transferred on a sheet of paper conveyed by drive of the transfer motor 28 and treated for fixation. Thereafter, it is delivered outside the machine.

Figure 3:
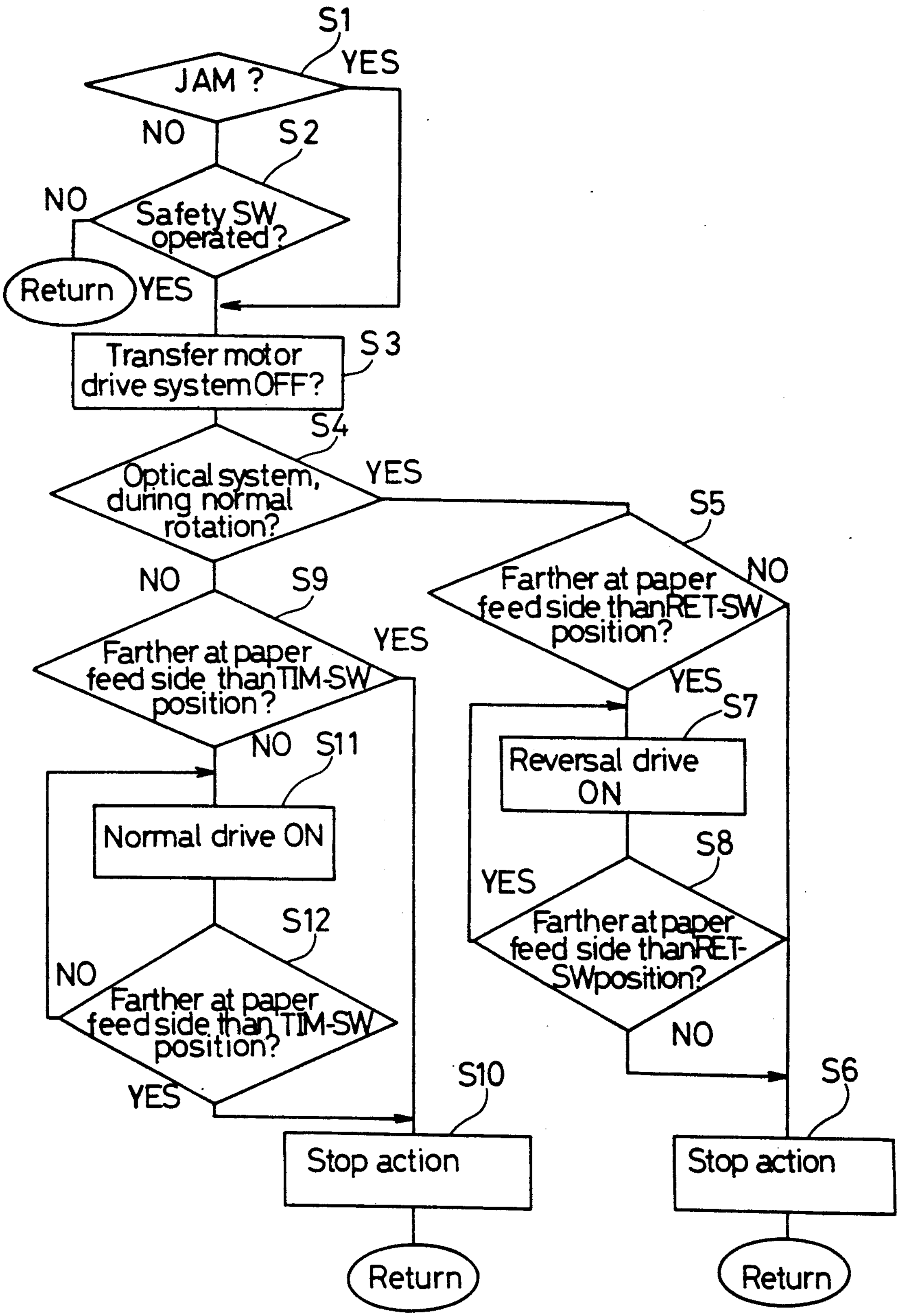
FIG. 3 is a flow chart showing the sequence of control of the essential parts in the drive device.

Subsequently, a processing in the corresponding image forming equipment when the power supply is stopped during action of the image forming as shown above is described with reference to FIG. 3.

Here, S1, S2, . . . in the Figure show steps of processing.

For example, if a status that paper jamming has occurred in the transfer path of paper (S1) or the cover has been opened (S2) is detected, the drive system of the transfer motor 28 is immediately turned OFF (S3).

Subsequently, in S4, in the case that it is judged that the moving direction of the optical system unit 3 is the direction of an arrow mark 31, it is further judged in S5 whether the first traveling frame 6 of the optical system unit 3 is at the arrow mark 31 side (paper feed side) or at the arrow mark 32 side farther than the return switch 16. In the above S5, in the case that the first traveling frame 6 of the optical system unit 3 is located at the arrow mark 32 side farther than the return switch 16, usual stop control is then carried out as the optical system unit 3 is in safety area. Namely, the power supply to the motor 25 is stopped, and the optical system unit 3 comes to a stop after it moves by inertia (S6).

On the other hand, in the case that it has been judged in the above S5 that the first traveling frame 6 is located at the arrow mark 31 side farther than the return switch 16, if the power supply to the motor 25 is stopped, the optical system unit 3 moves by its inertia and comes into collision with the box-like body 1 and the lens unit 19, so that in S7, reversal braking control is given to the motor 25, thereby causing the optical system unit 3 to come to a quick stop, and at the same time the moving direction to be reversed. Then, the optical system unit 3 will be going to the arrow mark 32. Thus, in the case that it is judged that the optical system unit 3 of which moving direction is reversed has moved to the arrow mark 32 side farther than the return switch 16 (S8), the stop processing in S6 is carried out as it is judged that the corresponding optical system unit 3 has been returned to the safety area.

In the above S4, in the case that it is judged that the optical system unit 3 is moved in the direction of the arrow mark 32, it is judged in S9 whether the first traveling frame 6 is located at the arrow mark 31 side or the arrow mark 32 side in relation to the timing switch 15.

In the above S9, when it is judged that the first traveling frame 6 is located at the arrow mark 31 side farther than the above timing switch 15, usual stop processing is carried out in S10 as the optical system unit 3 is located in the safety area. This stop processing is performed by stopping power supply to the above motor 25 as well as in the case of the above S6. As the power supply to the motor 25 is stopped, the optical system unit 3 comes to a stop in the safety area after it has moved by its inertia.

On the other hand, in the above S9, in the case that it is judged that the first traveling frame 6 is located at the arrow mark 32 side farther than the timing switch 15, if the power supply to the above motor 25 is immediately stopped, the optical system unit 3 moves in the direction of the arrow mark 32 by its inertia and there is a possibility for the second traveling frame 7 and the box-like body 1 to come into collision with each other. Therefore, in S11, reversal braking control is given to the above motor 25, thereby causing quick braking to act on the optical system unit 3, and its direction of moving to be reversed to the direction of the arrow mark 31. As described above, in the case that it is judged that the first traveling frame 6 of the optical system unit 3 of which moving direction has been reversed to the direction of the arrow mark 31 as shown above has been moved farther to the arrow mark 31 side than the timing switch 15 (S12), usual stop control is carried out in S10 as well as in the above case.

Thereby, the optical system unit 3 will come to a stop within the safety area.

In the image forming equipment according to the present preferred embodiment, even if the power supply is stopped during action of the image forming, collision of the optical system unit 3 with the box-like body 1, the lens unit 19 and/or the lens 20, etc. can be positively avoided to design to prevent each of the components from being damaged.

Hereupon, the power supply stop of this case means unexpected occurrence of paper jamming or opening status of the cover.

Hereupon, in the drive device according to the present invention, instead of installation of the timing switch 15 or the return switch 16 in the above preferred embodiment, these positions may be detected by the number of pulses and/or the time of movement corresponding to the distance from the home position switch 14.

Figure 4:
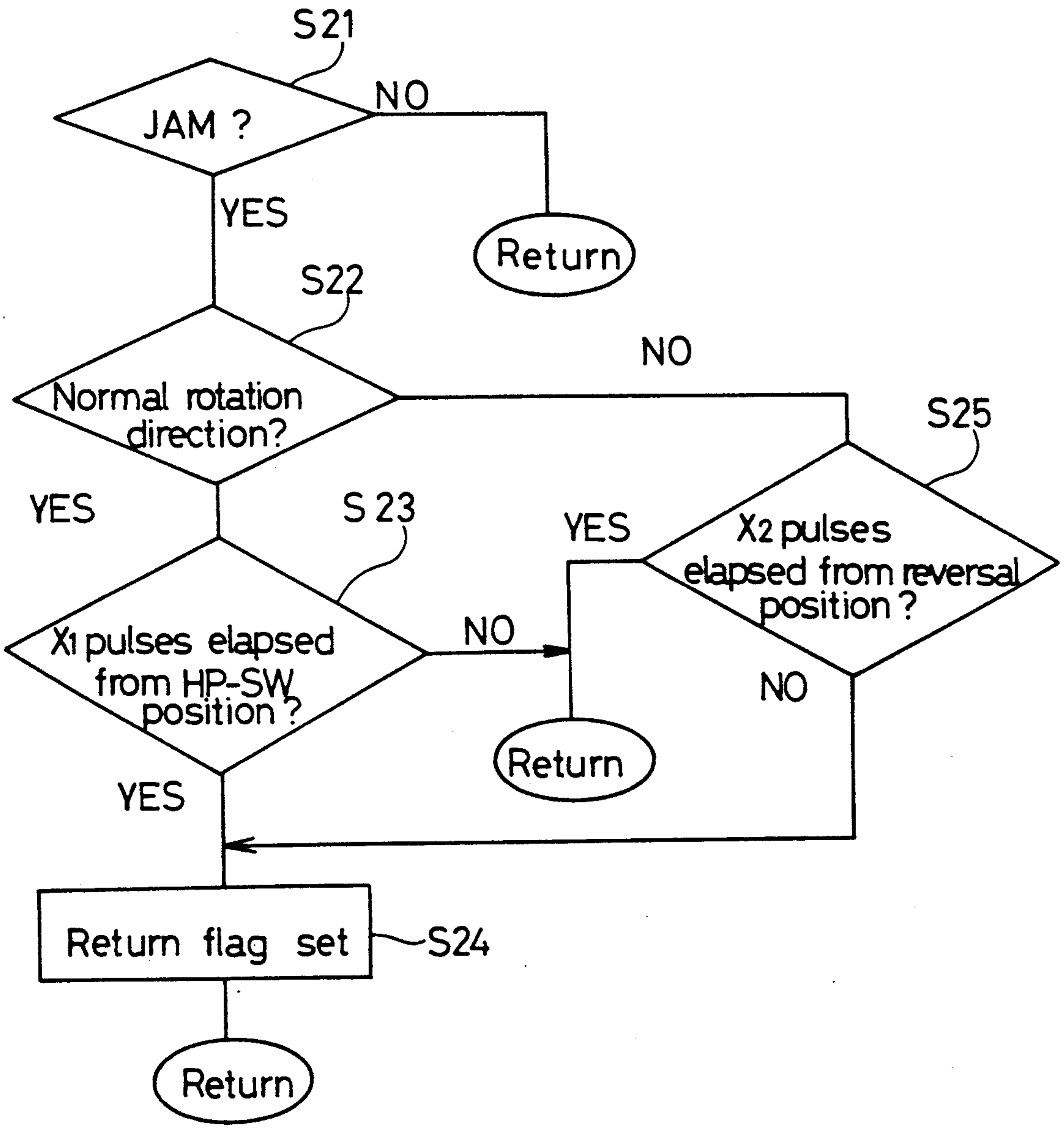
FIG. 4 is a flow chart showing the sequence of control of the essential parts in a drive device according to an another preferred embodiment of the present invention.
Figure 5:
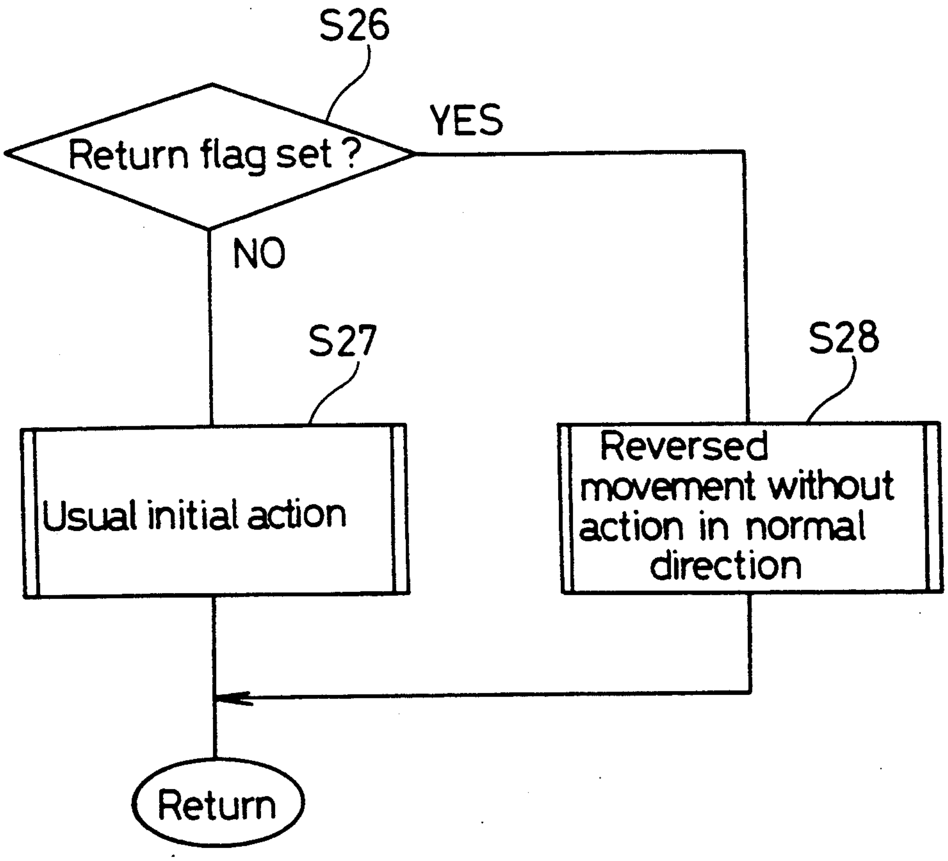
FIG. 5 is a flow chart showing the sequence of control of essential parts of a drive device according to a still another preferred embodiment of the present invention.

Subsequently, under a premise that image forming is restarted after the power supply is once stopped during action of image forming as shown above, processings in the corresponding image forming equipment are explained with reference to FIG. 4 and FIG. 5.

Here, S21, S22, . . . shows each processing step in these drawings. Also, X, $X_1$, $X_2$, . . . means the number of pulses outputted from an encoder directly connected to the motor 25 according to the movement of the optical system unit 3, X is the number of pulses corresponding to the distance along which the second traveling frame 7 of the optical system unit 3 is movable up to the lens unit 19 with the home position switch 14 made as reference, $X_2$ is the number of pulses corresponding to the distance where the second traveling frame 7 can come into collision with the above lens unit 19 without fail when the initial action of the optical system unit 3 is carried out, and $X_1$ corresponds to the number of pulses which is obtained by subtracting $X_2$ from X, and is the number of pulses corresponding to the limit distance where the second traveling frame 7 does not come into collision with the above lens unit 19 even when the second traveling frame 7 makes its initial action in the vicinity of the above lens unit 19.

For example, when a paper jamming occurs in the transfer path of paper, the power supply to the corresponding equipment is shut off and the movement of the second traveling frame 7 is stopped (S21), it is judged in S22 whether the optical system unit 3 is moving toward the arrow mark 31 or the arrow mark 32.

In the above S22, when it has been judged that the optical system unit 3 has been moving toward the arrow mark 31, then it is judged in S23 whether or not the number of pulses outputted from the encoder exceeds $X_1$. If it is judged in S23 that the number of pulse exceeds the $X_1$, if the initial action is started under this condition, the second traveling frame 7 may come into collision with the lens unit 19. Therefore, a return flag in the control device 27 is established to memorize this status (S24).

In the above S22, if it is judged that the optical system unit 3 has been reversely moving toward the arrow mark 32, it is judged in S25 whether or not the number of pulses outputted from the encoder exceeds the $X_2$. Then, in the case that it has been judged in S25 that the number of pulses does not exceeds the $X_2$, as the second traveling frame 7 may come into collision with the lens unit 19 if the optical system unit 3 is made to perform its initial action under this condition, the above return flag is established to memorize this status as well as in the case of S23. As shown above, the processing to detect the stop position of the optical system unit 3 on the rails when the power supply to the corresponding equipment is stopped is performed by S22, S23, and S25.

As an operator carries out treatment for paper jamming and the power supply is re-started, status of the above return flag is judged in S26.

In the above S26, in the case that it is judged that any return flag is not established, namely, in the case that it is judged that the second traveling frame 7 of the optical system unit 3 exists within the area expressed with the number of $X_1$ pulses, usual initial action is carried out in S27.

Namely, after the optical system unit 3 firstly moves in the direction of the arrow mark 31 in order to search for the original position 4 in the optical system unit 3, it is made to move in the direction of the arrow mark 32. By this action, as it is understood that the optical system unit 3 has returned to the original position 4 when the first traveling frame 6 is detected by the home position switch 14, the corresponding equipment enters its standby status for preparation of subsequent copying actions.

On the other hand, in the case that it is judged in S26 that the return flag is established, as the second traveling frame 7 positively comes into collision with the lens unit 19 if the initial action is carried out as well as in the case of S27, the optical system unit 3 is immediately made to move in the direction of the arrow mark 32 without moving in the direction of the arrow mark 31 (S28). And as it is understood that the optical system unit 3 has returned to the original position 4 if the first traveling frame 6 is detected at the home position switch 14, the optical system unit 3 enters its standby status for preparation of subsequent copying actions.

Namely, the processing in which the direction of movement of the optical system unit 3 is changed over according to the stop position thereof when a stop command is cancelled at the corresponding equipment and the optical system unit 3 is stopped after returning to the original position 4 is carried out by S24, S26, S27 and S28.

Even though the power supply is stopped during action of the image forming as the device according to the present preferred embodiment is so controlled as shown in the above, collision of the second traveling frame 7 of the optical system unit 3 with the lens unit 19 on restarting can be positively avoided, thereby causing each kind of component to be prevented from damages.

Hereupon, the power supply stop of this case means unexpected occurrence of paper jamming and opening status of the cover.

Hereupon, in a drive device according to the present invention, instead of installation of encoder in the above preferred embodiment, the position corresponding to the number of $X_1$, $X_2$ pulses may be detected with the time of movement of the optical system unit 3. By installing a switch at the position corresponding to the number of $X_1$, $X_2$ pulses, it may be judged, based upon output signals from the switch, whether or not the optical system unit 3 is made to perform its initial action.

What is claimed is:

1. A drive device for optical system for reciprocating the optical system within a specified area on rails by means of a motor controlled for drive and stop with availability and unavailability of power supply, comprising;
   - position sensing means for sensing a position of the optical system on the rails;
   - stop command sensing means for sensing a signal of stop command of the power supply; and
   - stop control means for controlling for reversal braking of the motor according to the position of the optical system sensed by the position sensing means when a signal of the stop command is sensed, for returning the optical system within the specified area and for stopping it.

2. A drive device for optical system for reciprocating the optical system within a specified area making an original position on rails as reference by means of a motor controlled for drive and stop with availability and unavailability of power supply, comprising;
   - stop command sensing means for sensing a signal of stop command of the power supply;
   - stop position sensing means for sensing a stop position of the optical system on the rails when the optical system comes to a stop by a signal of stop command; and
   - returning control means for changing over a direction of traveling according to the stop position of the optical system sensed by the stop position sensing means when the stop command is cancelled, and for returning the optical system to the original position and for stopping it.

3. A drive device for optical system defined in claim 1, wherein the position sensing means is a sensing switch for sensing presence or absence of the optical system at a specified position.

4. A drive device for optical system defined in claim 1, wherein the position sensing means is an encoder which outputs pulses of the number corresponding to the traveling distance of the optical system.

5. A drive device for optical system defined in claim 2, wherein the stop position sensing means is a sensing switch for sensing presence or absence of the optical system at a specified position.

6. A drive device for optical system defined in claim 2, wherein the stop position sensing means is an encoder which outputs pulses of the number corresponding to the traveling distance of the optical system.

* * * * *